(12) United States Patent
Adamson et al.

(10) Patent No.: US 6,794,084 B2
(45) Date of Patent: Sep. 21, 2004

(54) ALKALI METAL HYDROGEN PHOSPHATES AS PRECURSORS FOR PHOSPHATE-CONTAINING ELECTROCHEMICAL ACTIVE MATERIALS

(75) Inventors: George W. Adamson, Henderson, NV (US); Jeremy Barker, Oxfordshire (GB); Titus Faulkner, Henderson, NV (US); M. Yazid Saidi, Henderson, NV (US); Jeffrey Swoyer, Henderson, NV (US)

(73) Assignee: Valence Technology, Inc., Henderson, NV (US)

( * ) Notice: Subject to any disclaimer, the term of this patent is extended or adjusted under 35 U.S.C. 154(b) by 91 days.

(21) Appl. No.: 10/205,746

(22) Filed: Jul. 26, 2002

(65) Prior Publication Data

US 2004/0018135 A1 Jan. 29, 2004

(51) Int. Cl.$^7$ ................................ H01M 4/58
(52) U.S. Cl. .................... 429/218.1; 429/221; 429/224; 429/231.5
(58) Field of Search ........................... 429/218.1, 221, 429/224, 231.5

(56) References Cited

U.S. PATENT DOCUMENTS

| | | |
|---|---|---|
| 6,085,015 A | 7/2000 | Armand et al. |
| 6,391,493 B1 | 5/2002 | Goodenough et al. |
| 2002/0039687 A1 | 4/2002 | Barker et al. |

FOREIGN PATENT DOCUMENTS

| | | |
|---|---|---|
| EP | 0 571 858 B1 | 5/1993 |
| EP | 1 195 836 A2 | 10/2001 |
| JP | 9-135724 A1 | 11/1995 |
| JP | 9-135725 A1 | 11/1995 |
| WO | WO 9740541 A1 | 10/1997 |
| WO | WO 0227824 A1 | 4/2002 |
| WO | WO 0208355 A2 | 10/2002 |

OTHER PUBLICATIONS

Delmas et al., "Ionic Conductivity in a New NASICON Related Solid Solution: Na3+yCr2–yMgy(PO4)3, an Optical Characterization of the Skeleton Covalency" Mat. Res. Bull., vol. 21, pp. 469–477 (1986).

Okada et al., "Characteristics of 3–D Framework Cathodes with $(XO4)^{n-}$ Polyanions" Prog. Batteries Battery Mater., vol. 16, pp. 302–308 (1997).

Padhi et al., "Tuning the Position of the Redox Couples in Materials with NASICON Structure by Anionio Substitution" J. Electrochem. Soc., 145(5), 1518–1520 (1998).

Masquelier et al., "$Li_3Fe_2(XO_4)_3$ (X=P, As): Three Framework Structures as Hosts for the Reversible Insertion of Lithium" Proc. Power Sources Conf., 37th 188–191 (1996).

*Primary Examiner*—Joseph K. McKane
*Assistant Examiner*—Kamal Saeed
(74) *Attorney, Agent, or Firm*—Michael D. Ross; Roger A. Williams; Cynthia S. Kovacevic (57) ABSTRACT

The present invention relates general to a method for making an alkali metal hydrogen phosphate of the general formula $A_xH_{3-x}PO_4$, wherein A is an alkali metal and $0 \leq x \leq 3$, prepared by admixing an alkali metal-containing compound, a phosphate-supplying compound, and water, where water is present in the mixture at a level of from about 5% to 25% by weight.

25 Claims, 1 Drawing Sheet

Figure 1

ALKALI METAL HYDROGEN PHOSPHATES AS PRECURSORS FOR PHOSPHATE-CONTAINING ELECTROCHEMICAL ACTIVE MATERIALS

FIELD OF THE INVENTION

The present invention relates to use of alkali metal hydrogen phosphates as precursors in the synthesis of phosphate-containing electrochemical active materials, and methods of preparing alkali metal hydrogen phosphates.

BACKGROUND OF THE INVENTION

A rechargeable or "secondary" battery typically consists of one or more electrochemical cells, wherein each cell typically includes a cathode, an anode, and a liquid electrolyte or other material interposed there between for facilitating movement of ionic charge carriers between the anode and cathode. As the cell is charged, cations are removed from the cathode material and are deposited on and/or inserted into the anode. During discharge, cations migrate from the anode to the electrolyte and, in turn, from the electrolyte to the cathode.

Such batteries generally include insertion or "intercalation" electrodes containing materials that have a crystal lattice structure or framework into which ions can be inserted or intercalated, and subsequently extracted.

Alkali metal-containing phosphates (e.g. lithium phosphates), in particular, are desirable electrode materials because they have a higher initial electrical capacity (A·hr/g) than typical transition metal chalcogenide cathode active materials, and a low capacity loss throughout the life of the electrochemical cell.

The inventors of the present invention have found that alkali metal hydrogen phosphates, and in particular lithium hydrogen phosphates, exhibit a higher reactivity than other precursor compounds, contribute phosphate to the final alkali metal-containing phosphate active material product, eliminate undesirable by-products inherent in previously practiced synthesis routes, and yield active materials that exhibit superior performance-related properties as compared to active materials synthesized using conventional reactants. Unfortunately, presently known methods of manufacturing alkali metal hydrogen phosphates are not commercially viable, particularly for production of a battery active precursor material, due to difficulty in controlling reagents, incomplete reaction, inefficient utilization of reactor volume, failure to yield a homogenous reaction product, and reduced yield.

SUMMARY OF THE INVENTION

The present invention provides a cathode active material formed by a reaction of one or more suitable metal-containing compounds with an alkali metal hydrogen phosphate of the general formula $A_xH_{3-x}PO_4$, wherein $0 \leq x \leq 3$, preferably $0 \leq x \leq 3$; and A is an alkali metal.

In one embodiment, the cathode active material is formed by a reaction of one or more suitable metal-containing compounds with a lithium hydrogen phosphate of the general formula $Li_xH_{3-x}PO_4$, where $0 \leq x \leq 3$, preferably $0 \leq x \leq 3$, and wherein the lithium hydrogen phosphate is prepared by admixing lithium carbonate, phosphoric acid, and water to form a mixture wherein the water in the mixture is at a level of from about 5% to about 25% by weight of the total mixture. A preferred method includes adding the water as a solvent for the phosphoric acid, and subsequently admixing this phosphoric acid solution to essentially dry lithium carbonate powder.

It has been found that when lithium hydrogen phosphate is employed as a reactant, the lithium hydrogen phosphate exhibits a higher reactivity than other precursor compounds, contributes phosphate to the final lithium metal phosphate active material product, eliminates undesirable by-products inherent in previously practiced synthesis routes, and yields active materials that exhibit superior performance-related properties as compared to active materials synthesized using conventional reactants.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention. Thus, variations that do not depart from the general scope of the invention are intended to be within the scope of the invention.

DETAILED DESCRIPTION OF THE PREFERRED EMBODIMENTS

The present invention provides a cathode active material formed by a reaction of one or more suitable metal-containing compounds with an alkali metal hydrogen phosphate of the general formula (I), $$A_xH_{3-x}PO_4, \tag{I}$$

wherein $0 \leq x \leq 3$, preferably $0 \leq x \leq 3$, and A is an alkali metal, preferably an alkali metal selected from the group consisting of Na (Sodium), K (Potassium), Li (Lithium), and mixtures thereof.

In one embodiment, a cathode active material is formed by a reaction of one or more suitable metal-containing compounds with an alkali metal hydrogen phosphate of the general formula $$Li_xH_{3-x}PO_4, \tag{II}$$

wherein $0 \leq x \leq 3$, preferably $0 \leq x \leq 3$.

The present invention also provides methods of making alkali metal hydrogen phosphates of general formulas (I) and (II). The specific value of x is determined according to the desired stoichiometry of the electrode active material. Preferred embodiments include those where x is about 1, those where x is about 2, and those where x is about 3. As used herein, the word "include," and its variants, is intended to be non-limiting, such that recitation of items in a list is not to the exclusion of other like items that may also be useful in the materials, compositions, devices, and methods of this invention. Also, as used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention. In addition, unless otherwise specified, a variable described algebraically as equal to ("="), less than or equal to ("≤"), or greater than or equal to ("≥") a number is intended to subsume values or ranges of values about equal or functionally equivalent to said number. Finally, as referred to herein, "Group" refers to the Group numbers (i.e., columns) of the Periodic Table as defined in the current IUPAC Periodic Table. See, e.g., U.S. Pat. No. 6,136,472, Barker et al., issued Oct. 24, 2000, incorporated by reference herein.

Method of Making Alkali Metal Hydrogen Phosphates:

An alkali metal hydrogen phosphate of general formula (I) is prepared by reacting a suitable alkali metal-supplying compound with a suitable phosphate-supplying compound. Preferably, the alkali metal hydrogen phosphate compound of the present invention is the acid-base reaction product of an alkali metal-containing base and a phosphate-containing or supplying acid.

In one embodiment, the alkali metal hydrogen phosphate is a lithium hydrogen phosphate of general formula (II), and is formed by the reaction of lithium carbonate ($Li_2CO_3$) and phosphoric acid (i.e. orthophosphoric acid, $H_3PO_4$), in the following reaction mechanism (A).

$$Li_2CO_3+2H_3PO_4 \rightarrow 2LiH_2PO_4+H_2O+CO_2 \quad (A)$$

The following intermediate reactions (B), (C), and (D), form during reaction (A).

$$3Li_2CO_3+2H_3PO_4 \leftrightharpoons 2Li_3PO_4+3H_2CO_3 \quad (B)$$

$$Li_3PO_4+2H_3PO_4 \leftrightharpoons 3LiH_2PO_4 \quad (C)$$

$$H_2CO_3 \leftrightharpoons H_2O+CO_2 \quad (D)$$

By varying the relative ratios of the lithium carbonate and orthophosphoric acid reagents, the value of x can range from greater than 0 to less than 3. Thus, the relative quantity of lithium (or other alkali metal) within the compound can be selected depending on the relative ratio of lithium to phosphate desired in the active material (the "Li:$PO_4$ ratio"). When the Li:$PO_4$ ratio is 1:1 the compound formed is $Li_2O.P_2O_5.2H_2O$, or $LiH_2PO_4$, where x=1. When the Li:$PO_4$ ratio is 2:1 the compound formed is $2Li_2O.P_2O_5.H_2O$, or $Li_2HPO_4$, where x=2. The stoichiometry however can vary between 0 and 3, in that it can reflect a weighted average of the mono-, di-, and tri-basic constituents.

A suitable solvent is water. When employed, water is present in the reaction mixture in a range of from about 5% to about 25% by weight, more preferably from about 7% to about 20%. (Unless indicated otherwise, all percentages herein are by weight.)

One method of forming alkali metal hydrogen phosphate includes forming a phosphoric acid solution by solvating phosphoric acid (or other suitable phosphate-providing compound) with water, followed by admixing the phosphoric acid solution and an "essentially dry" alkali metal-containing basic compound, preferably an alkali metal-containing carbonate compound (e.g. lithium carbonate), by adding the phosphoric acid solution to the alkali metal-containing basic compound. An "essentially dry" powder contains from about 0% to about 5%, preferably less than about 2%, of water. The concentration of phosphoric acid in solution is from about 70% to about 95%. By performing the reaction with concentrated reactants, the reactor volume utilization is greatly increased, thus increasing the reaction efficiency.

As the phosphoric acid solution is admixed with the alkali metal-containing compound, the mixture is agitated until the reaction proceeds to completion. Agitation is performed by vigorous mixing, in such a manner to release the gas formed from the reaction and minimize the generation of foam, preferably by compressing the foaming mixture during mixing. Mixing also provides a substantially homogenous reaction mixture. Mixing may be accomplished using a whisk-type mixer adapted to contact the exterior circumference of the reactor vessel. Other suitable mixers include a kneading screw mixer, a helical blade mixer, a planetary motion mixer, and a double-arm kneading screw mixer.

Another method of forming alkali-metal hydrogen phosphate includes forming a phosphoric acid solution by solvating phosphoric acid (or other suitable phosphate-providing compound) with water, followed by admixing the phosphoric acid solution with an alkali metal-containing hydroxide compound (e.g. lithium hydroxide) or an alkali metal-containing hydroxide compound in combination with another alkali metal-containing basic compound (e.g. an alkali metal-containing carbonate compound). In this method, adequate cooling must be provided because the reaction is highly exothermic, or the reagents used must be sufficiently dilute to ensure that the reaction mixture does not boil. If dilute reagents are used, the lithium hydrogen phosphate solution produced will also be dilute, and thus suitable for spray-drying.

An anti-caking agent may be added to the reaction mixture. Anti-caking agents, among those useful herein, include silica salts.

The rate of reaction is very rapid, occurring immediately upon mixing of the reactants. Alternatively, the reaction rate can be slowed by controlling the rate at which the precursor compounds are admixed with one another.

Figure 1:
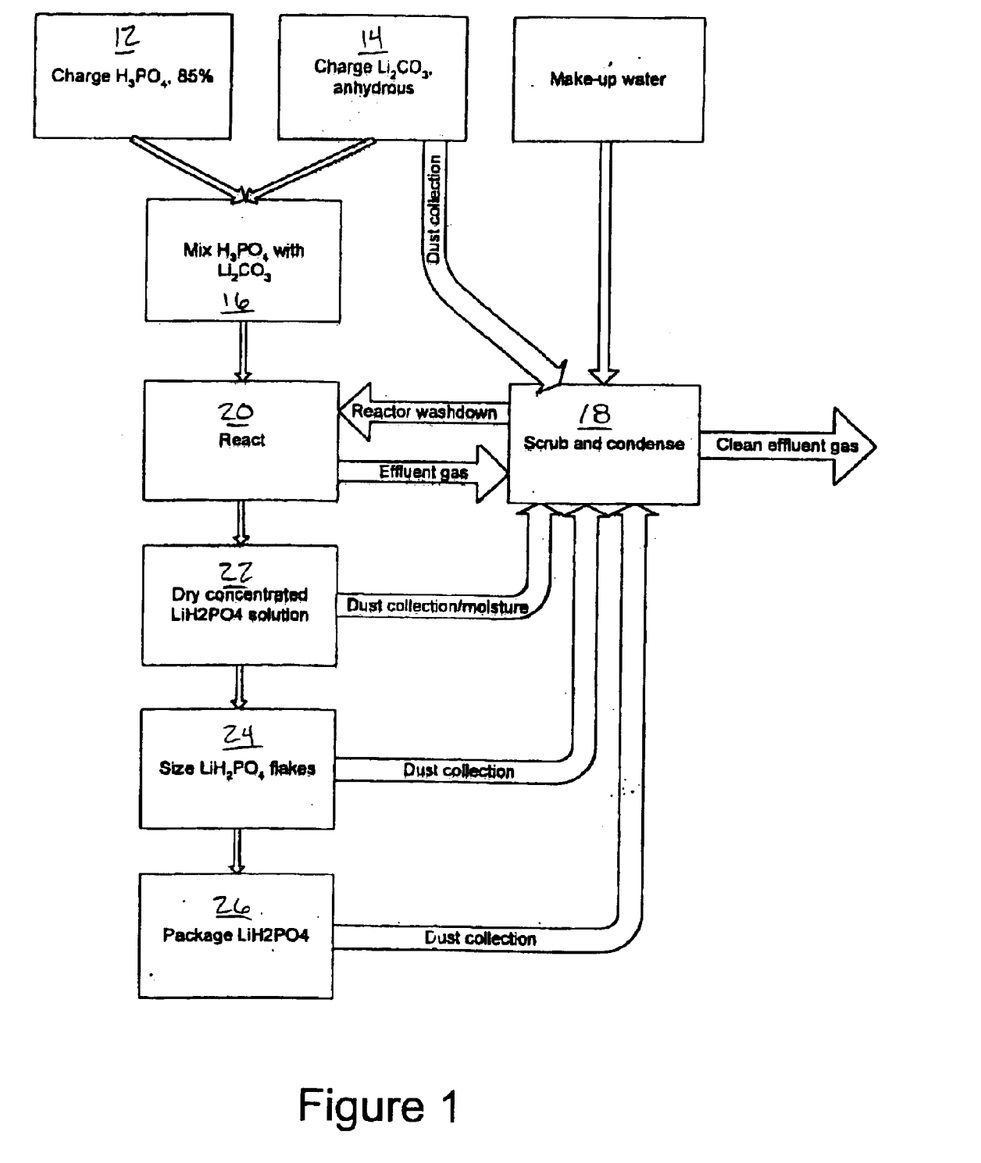
FIG. 1 is a flow diagram describing a method of making alkali metal hydrogen phosphates of the present invention.

A method of manufacturing dry, solid state alkali hydrogen phosphate via a continuous process is generally outlined in FIG. 1. A phosphate source and alkali metal source are charged 12 and 14, respectively, from their respective storage devices or containers (not illustrated) into a reactor or other suitable device, and then admixed 16. Preferably, when the alkali metal phosphate is lithium hydrogen phosphate, the phosphate source reagent material is phosphoric acid and the alkali metal source reagent material is an essentially dry lithium carbonate powder. The phosphate reagent is admixed with water as solvent to form a phosphoric acid solution. Alternatively, the phosphoric acid may be commercially obtained as a solution in water where the phosphoric acid concentration is between about 70% to about 95%.

The relative ratios of alkali metal and phosphate sources will dictate the ultimate product stoichiometry of the alkali metal hydrogen phosphate where x values can be engineered from $0 \leq x \leq 3$ in the general alkali metal hydrogen phosphate formula $A_xH_{3-x}PO_4$. Depending on the volume of essentially dry lithium carbonate, where employed, a "dust" collection assembly (e.g. a baghouse or an electrostatic precipitator, illustrated generally in FIG. 1 as reference number 18) may be employed to capture airborne particulate lithium carbonate for either removal or reuse. The "dust" collection assembly is also provided for treating effluent gas evolved during the process, and for treating solvents (e.g. water) used to clean the one or more reactor vessels employed in the process.

As noted above, the reagent materials are admixed 16 within the reactor vessel, thereby causing the reagent materials to react 20 to form the alkali metal hydrogen phosphate and other by-products. A continuous mixing device is included in the reactor for proper mixing, and foam reduction is enabled by the efficient release of the gas formed within the reaction mixture. The reactor can be any of numerous conventional reactors known in the art. One preferred reactor and mixing device selection includes a kneading screw mixer in series with a continuously stirred tank reactor (CSTR). The reactants are continuously mixed in a trough chamber by the kneading screw mixer. This reactor scenario enables simultaneous mixing and reaction. An alternate mixing device and reactor may include a reactor vessel with a double planetary mixer, or use of either of the above screw mixer or the CSTR independently.

The reaction products are introduced into a suitable processing device to permit recovery of the alkali metal hydrogen phosphate product, and the processing device is selected from the group consisting of a dryer, a spray dryer, a crystallizer, a separator, an evaporator, a filtration or settling device, and combinations thereof. The processing device is chosen depending on the desired phase of the reaction products, the physical characteristics and morphological specifications of the products, and possible impurities.

In one embodiment, the processing device is a dryer that separates the alkali metal hydrogen phosphate product from the other by-products and the solvent by drying 22 the same.

Another preferred processing device is a spray dryer, wherein the alkali metal hydrogen phosphate solution is atomized and mixed with a stream of hot gas. The exit temperature of the drier is preferably below the dehydration temperature of the alkali metal hydrogen phosphate compound, preferably between about 120° C. and about 180° C. The powder obtained from the alkali metal hydrogen phosphate solution can be crystalline, or alternatively amorphous, depending on the recovery process conditions (e.g. heat, mechanical handling, and rate of drying). Preferably, the dried alkali metal hydrogen phosphate powder particle size is substantially uniform, preferably having a mean particle size diameter (D50) of less than about 20 microns.

The alkali metal hydrogen phosphate product may be further processed/sized 24 using a grinding device (e.g. a jet mill). The ground alkali metal hydrogen phosphate is then collected and packaged 26, or exported directly to a reaction vessel for use as an electrode active material precursor.

Phosphate-Containing Electrode Active Materials:

Alkali metal hydrogen phosphates of the present invention are suitable precursors for phosphate-containing electrode active materials of the general formula (III), $$A_a M_b (PO_4)_c Z_d,  \quad (III)$$

wherein:

(a) A is a combination of one or more alkali metals;

(b) M includes at least one element capable of undergoing oxidation to a higher valence state in the compound; and (c) Z is selected from the group consisting of one or more halogens, hydroxyls, and mixtures thereof;

wherein $0 < a \leq 9$; $1 \leq b \leq 3$; $0 < c \leq 3$; $0 \leq d \leq 6$; and M, Z, a, b c and d are selected so as to maintain electroneutrality of the active material.

In one embodiment, is Li (Lithium), Na (Sodium), K (Potassium), or mixtures thereof. In another embodiment, A is Li, or mixture of Li with Na and/or K. In another embodiment, A is Na, or a mixture of Na with K.

M includes one or more elements capable of undergoing oxidation to a higher valence state (e.g., $Fe^{+2} \rightarrow Fe^{+3}$) in the compound. In one embodiment, M is a transition metal selected from the group consisting of elements from Groups 4 through 11 of the Periodic Table, notably those selected from the group consisting of Ti (Titanium), V (Vanadium), Cr (Chromium), Mn (Manganese), Fe (Iron), Co (Cobalt), Ni (Nickel), Cu (Copper), Zr (Zirconium), Nb (Niobium), Mo (Molybdenum), Ru (Ruthenium), Rh (Rhodium), Pd (Palladium), Ag (Silver), Cd (Cadmium), Hf (Hafnium), Ta (Tantalum), W (Tungsten), Re (Rhenium), Os (Osmium), Ir (Iridium), Pt (Platinum), Au (Gold), Hg (Mercury), and mixtures thereof. Preferred are the first-row transition series (the 4th Period of the Periodic Table), namely those selected from the group consisting of Ti, V, Cr, Mn, Fe, Co, Ni, Cu, and mixtures thereof. As used herein, the recitation of a genus of elements, materials or other components, from which an individual component or mixture of components can be selected, is intended to include all possible subgeneric combinations of the listed components, and mixtures thereof.

In another embodiment, M is $MI_{1-m}MII_m$, wherein MI is at least one transition metal selected from Groups 4 through 11 of the Periodic Table, MII is at least one non-transition metal selected from Groups 2, 3, and 12 through 16 of the Periodic Table, and $0 \leq m \leq 1$. As referred to herein, "non-transition metals" include metals and metalloids from Groups 2, 3, and 12 through 16 of the Periodic Table that are capable of forming stable active materials, that occupy sites in the active material crystal lattice that otherwise would be occupied by transition metal atoms, and do not significantly impede the insertion or removal of lithium or other alkaline metals from the active materials under normal operating conditions. Preferably, such elements do not include C (carbon), Si (silicon), N (nitrogen) and P (phosphorus).

Among the non-transition metals useful herein are those selected from the group consisting of Group 2 elements, particularly Be (Beryllium), Mg (Magnesium), Ca (Calcium), Sr (Strontium), Ba (Barium); Group 3 elements, particularly Sc (Scandium), Y (Yttrium), and the lanthanides, particularly La (Lanthanum), Ce (Cerium), Pr (Praseodymium), Nd (Neodymium), Sm (Samarium); Group 12 elements, particularly Zn (zinc) and Cd (cadmium); Group 13 elements, particularly B (Boron), Al (Aluminum), Ga (Gallium), In (Indium), Tl (Thallium); Group 14 elements, particularly Si (Silicon), Ge (Germanium), Sn (Tin), and Pb (Lead); Group 15 elements, particularly As (Arsenic), Sb (Antimony), and Bi (Bismuth); Group 16 elements, particularly Te (Tellurium); and mixtures thereof.

Preferred non-transition metals include those that, in addition to the above-noted properties, also do not readily undergo oxidation to a higher valence state in the electrode active material when the electrochemical cell is operating under normal operating conditions. Most preferred are the non-transition metals that have only a +2 oxidation state (other than ground state $M^0$), notably Be, Mg, Ca, Sr, Ba Zn, Cd, and mixtures thereof. Also most preferred are the non-transition metals that have only a +2 oxidation state (other than ground state $M^0$), notably Sc, Y, La, B, Al, Ga, In, and mixtures thereof.

In another embodiment, M of general formula (III) is $M^1_e M^2_f M^3_g$, wherein:

(a) $M^1$ is at least one transition metal from Groups 4 to 11, most preferably the first-row transition series (the 4th Period of the Periodic Table), namely those selected from the group consisting of Ti, V, Cr, Mn, Fe, Co, Ni, Cu, and mixtures thereof;

(b) $M^2$ is at least one +2 oxidation state non-transition metal; and (c) $M^3$ is at least one +3 oxidation state non-transition metal, wherein $e > 0$, $f \geq 0$, $g \geq 0$, and $(e+f+g) = b$.

In one embodiment, $M^2$ is at least one +2 oxidation state non-transition metal selected from the group consisting of Mg, Ca, Zn, Sr, Pb, Cd, Sn, Ba, Be, and mixtures thereof. Preferably, $M^2$ is at least one non-transition metal that has only a +2 oxidation state (other than ground state zero), and is selected from the group consisting of Be, Mg, Ca, Sr, Ba Zn, Cd, and mixtures thereof.

In one embodiment, $M^3$ is at least one +3 oxidation state non-transition metal selected from group consisting of Sc, Y, La, Ce, Pr, Nd, Sm, B, Al, Ga, In, Tl, As, Sb, Bi, and mixtures thereof. Preferably, $M^3$ is at least one non-transition metal that has only a +3 oxidation state (other than ground state zero), and is selected from the group consisting of Sc, Y, La, B, Al, Ga, In, and mixture thereof.

Referring again to general formula (Ill), preferred structures are those that are similar to the mineral olivine where c=1, and those having a structure similar to NASICON (NA Super Ionic CONductor) materials (NASICONs) where c=3.

Cathode active materials of general formula (III), as well as those of general formulas (IV) and (V) discussed below, may optionally include Z, which is selected from the group consisting of a hydroxyl, halogen, or mixtures thereof. In one embodiment, Z is selected from the group consisting of OH (Hydroxyl), F (Fluorine), Cl (Chlorine), Br (Bromine), and mixtures thereof. In one embodiment, Z is OH. In another embodiment, Z is F, or mixtures of F with OH, Cl, or Br.

Additional phosphate-containing electrode active materials that can be made using an alkali metal hydrogen phosphate also include those of the general formula (IV), $$Li_aCo_eFe_fM^1{}_gM^2{}_hM^3{}_iPO_4, \qquad (IV)$$

wherein:

(a) $0 \leq a \leq 2$, $e \geq 0$, and $f \geq 0$;

(b) $M^1$ is one or more transition metals, where $g \geq 0$;

(c) $M^2$ is one or more +2 oxidation state non-transition metals, where $h \geq 0$;

(d) $M^3$ is one or more +3 oxidation state non-transition metals, where $i \geq 0$; wherein $(e+f+g+h+i) \leq 2$, and $M^1$, $M^2$, $M^3$, a, e, f, g, h, and i, are selected so as to maintain electroneutrality of said compound.

In one embodiment, $0.8 \leq (e+f+g+h+i) \leq 1.2$, preferably $0.9 \leq (e+f+g+h+i) \leq 1$. With respect to Co, $e \geq 0.5$, preferably $e \geq 0.8$. With respect to Fe, $0.01 \leq f \leq 0.5$, preferably, $0.05 \leq f \leq 0.15$.

With respect to $M^1$, $0.01 \leq g \leq 0.5$, more preferably, $0.05 \leq g \leq 0.2$. In one embodiment, $M^1$ is selected from the group consisting of Ti, V, Cr, Mn, Ni, Cu and mixtures thereof. In another embodiment, $M^1$ is selected from the group consisting of Mn, Ti, and mixtures thereof.

Preferably, $(h+i)>0$, more preferably $0.01 \leq (h+i) \leq 0.5$, more preferably $0.02 \leq (h+i) \leq 0.3$. Preferably, $0.01 \leq h \leq 0.2$, more preferably, $0.01 \leq h \leq 0.1$. In one embodiment, $M^2$ is selected from the group consisting of Be, Mg, Ca, Sr, Ba, and mixtures thereof. Preferably, $M^2$ is Mg. Preferably, $0.01 \leq i \leq 0.2$, more preferably $0.01 \leq i \leq 0.1$. In one embodiment, $M^3$ is selected from the group consisting of B, Al, Ga, In, and mixtures thereof. Preferably, $M^3$ is Al.

Phosphate-containing electrode active materials that can be made using an alkali metal hydrogen phosphate also include those of the general formula (V), $$LiM(PO_{4-x}Y'_x), \qquad (V)$$

wherein (a) M is $M^1{}_gM^2{}_hM^3{}_iM^4{}_j$, wherein (1) $M^1$ is one or more transition metals;

(2) $M^2$ is one or more +2 oxidation state non-transition metals;

(3) $M^3$ is one or more +3 oxidation state non-transition metals, (4) $M^4$ is one or more +1 oxidation state non-transition metals;

(b) Y' is halogen; and (c) $g>0$; $h \geq 0$; $i \geq 0$; $j \geq 0$; $(g+h+i+j) \leq 1$; and the net valence of M is 2-x.

In one embodiment, $g \geq 0.8$, preferably, $g \geq 0.9$. In one embodiment, $M^1$ is a +2 oxidation state transition metal selected from the group consisting of V, Cr, Mn, Fe, Co, Ni, and mixtures thereof. Preferably, $M^1$ is selected from the group consisting of Fe, Co, and mixtures thereof. In another embodiment, $M^1$ is selected from the group consisting of Fe, Co, Ti, and mixtures thereof.

Preferably, $(h+i)>0.1$, more preferably, $0.02 \leq (h+i) \leq 0.5$, more preferably $0.02 \leq (h+i) \leq 0.3$. Preferably, $0.01 \leq h \leq 0.2$, more preferably, $0.01 \leq h \leq 0.1$. Preferably, $M^2$ is selected from the group consisting of Be, Mg, Ca, Sr, Ba, and mixtures thereof. Preferably, $0.01 \leq i \leq 0.2$, more preferably, $0.01 \leq i \leq 0.1$. Preferably, $M^3$ is Al.

In one embodiment, $j=0$. In another embodiment, $0.01 \leq j \leq 0.1$. Preferably, $M^4$ is selected from the group consisting of Li, Na, and K. More preferably, $M^4$ is Li.

In one embodiment, $x=0$. In another embodiment, $0<x \leq 1$. In such an embodiment, preferably, $0.01 \leq x \leq 0.05$, and $(g+h+i+j)<1$. In an embodiment where $j=0$, preferably, $(g+h+i)=1-x$.

In each of the cathode active materials noted herein, namely those of general formulas (III) through (V), $PO_4$ (the phosphate group) may be a mixture of $PO_4$ with a substituted $XY_4$ group, wherein $XY_4$ is selected from the group consisting of $X'O_{4-x}Y'_x$, $X'O_{4-y}Y_{2y}$, $X''S_4$, and mixtures thereof, where X' is P (Phosphorus), As (Arsenic), Sb (Antimony), Si (Silicon), Ge (Germanium), V (Vanadium) S (Sulfur), and mixtures thereof; X" is P, As, Sb, Si, Ge, V, and mixtures thereof; Y' is a S, nitrogen (N) halogen; $0 \leq x < 3$; and $0 < y < 4$.

When part of the phosphate group is substituted, it is preferred that the substitute group be present in a minor amount relative to the phosphate. In a preferred embodiment, $XY_4$ comprises 80% or more phosphate and up to about 20% of one or more phosphate substitutes. Phosphate substitutes include, without limitation, silicate, sulfate, antimonate, germanate, arsenate, monofluoromonophosphate, difluoromonophosphate, sulfur analogs thereof, and combinations thereof. $XY_4$ groups include those of the formula $(PO_4)_{1-k}(B)_k$, where B represents an $XY_4$ group or combination of $XY_4$ groups other than phosphate, and $k \leq 0.5$. Preferably, $k \leq 0.8$, more preferably less than about $k \leq 0.2$, more preferably $k \leq 0.1$.

Non-limiting examples of preferred active materials that can be synthesized using the starting materials of the present invention include the following:

$LiFePO_4$; $LiFe_{0.9}Mg_{0.1}PO_4$; $LiFe_{0.8}Mg_{0.2}PO_4$;
$LiFe_{0.95}Mg_{0.05}PO_4$,
$Li_{1.025}Co_{0.85}Fe_{0.05}Al_{0.025}Mg_{0.05}PO_4$,
$Li_{1.025}Co_{0.80}Fe_{0.10}Al_{0.025}Mg_{0.05}PO_4$,
$Li_{1.025}Co_{0.75}Fe_{0.15}Al_{0.025}Mg_{0.05}PO_4$, $Li_{1.025}Co_{0.7}(Fe_{0.4}Mn_{0.6})_{0.2}Al_{0.025}Mg_{0.05}PO_4$,
$LiCo_{0.8}Fe_{0.1}Al_{0.025}Ca_{0.05}PO_{3.975}F_{0.025}$,
$LiCo_{0.8}Fe_{0.1}Al_{0.025}Mg_{0.05}PO_{3.975}F_{0.025}$,
$LiCo_{0.8}Fe_{0.1}Ti_{0.025}Mg_{0.05}PO_4$;
$Li_{1.025}Co_{0.8}Fe_{0.1}Ti_{0.025}Al_{0.025}PO_4$;
$Li_{0.025}Co_{0.8}Fe_{0.1}Ti_{0.025}Mg_{0.25}PO_{3.975}F_{0.025}$;
$LiCo_{0.825}Fe_{0.1}Ti_{0.025}Mg_{0.025}PO_4$;
$LiCo_{0.85}Fe_{0.075}Ti_{0.025}Mg_{0.025}PO_4$; and mixtures thereof.

A particularly preferred active material is $Li_{1.025}Co_{0.08}Fe_{0.1}Mg_{0.025}Al_{0.025}Ti_{0.025}PO_4$.

Synthesizing Active Materials using Alkali Metal Hydrogen Phosphates

The particular starting materials employed in conjunction with the alkali metal hydrogen phosphates of the present invention will depend on the particular active material to be synthesized, reaction method, and desired by-products.

In addition to the alkali metal hydrogen phosphates, additional sources of alkali metal may be provided in the reaction mixture (e.g. salts or ionic compounds of lithium, sodium, potassium, rubidium or cesium, including hydrates thereof), and a wide range of such materials is well known in the field of inorganic chemistry (e.g. lithium, sodium, and/or potassium fluorides, chlorides, bromides, iodides, nitrates, nitrites, sulfates, hydrogen sulfates, sulfites, bisulfites, carbonates, bicarbonates, borates, silicates, antimonates, arsenates, germinates, oxides, acetates, oxalates, and the like).

Sources of metals M, M', M", $M^1$, $M^2$, $M^3$, and $M^4$ include fluorides, chlorides, bromides, iodides, nitrates, nitrites, sulfates, hydrogen sulfates, sulfites, bisulfites, carbonates, bicarbonates, borates, silicates, antimonates, arsenates, germanates, oxides, hydroxides, acetates, and oxalates thereof. Hydrates thereof may also be used.

Incorporation of a Z moiety requires further reaction of the reaction components with a halide or hydroxyl containing alkali metal salt. The solid active material compound is admixed with an alkali metal salt, where it is heated to approximately 750° C. for about 8 hours in an inert atmosphere, and then is cooled to room temperature, where the lithium and halide or hydroxyl group reacts in stoichiometric proportions.

One method for preparing the alkali metal phosphate active materials is via the hydrothermal treatment of the requisite starting materials, namely a source of M, alkali metal hydrogen phosphate, and (optionally) a reducant or reducing agent. In a hydrothermal reaction, the starting materials are mixed with a small amount of a liquid (e.g. water), and heated in a pressurized vessel or bomb at a temperature that is relatively lower as compared to the temperature necessary to produce the active material in an oven at ambient pressure. Preferably, the reaction is carried out at temperature of about 150° C. to about 450° C., under pressure, for a period of about 4 to about 48 hours, or until a reaction product forms.

Another method for synthesizing the active materials using alkali metal hydrogen phosphates of the present invention is via a thermite reaction, wherein M (or where M includes more than one element, the oxidizable elements of M) is reduced by a granular or powdered metal present in the reaction mixture.

Active materials can also be readily synthesized via a solid state reaction, with or without simultaneous oxidation or reduction of oxidizable elements of M, by heating M in the presence of an alkali metal hydrogen phosphate of the present invention (and optionally other materials, depending of the desired final product) at a given temperature a for a given period of time, until the desired reaction product forms.

The starting materials are provided in powder or particulate form, and are mixed together with any of a variety of procedures, such as by ball milling, blending in a mortar and pestle, and the like. Thereafter the mixture of powdered starting materials may be compressed into a pellet and/or held together with a binder (which may also serve as a source of reducing agent) material to form a closely cohering reaction mixture. The reaction mixture is heated in an oven, generally at a temperature of about 400° C. or greater, until a reaction product forms.

The reaction may be carried out under reducing or oxidizing conditions. Reducing conditions may be provided by performing the reaction in a "reducing atmosphere" such as hydrogen, ammonia, carbon monoxide, methane, mixtures of thereof, or other suitable reducing gas. Alternatively or in addition thereto, the reduction may be carried out in situ by including in the reaction mixture a reductant that will participate in the reaction to reduce the oxidizable elements of M, but that will produce by-products that will not interfere with the active material when used later in an electrode or an electrochemical cell.

In one embodiment, the reductant is elemental carbon, wherein the reducing power is provided by simultaneous oxidation of carbon to carbon monoxide and/or carbon dioxide. An excess of carbon, remaining after the reaction, is intimately mixed with the product active material and functions as a conductive constituent in the ultimate electrode formulation. Accordingly, excess carbon, on the order of 100% or greater, may be used. The presence of carbon particles in the starting materials also provides nucleation sites for the production of the product crystals.

The source of reducing carbon may also be provided by an organic material that forms a carbon-rich decomposition product, referred to herein as a "carbonaceous material," and other by-products upon heating under the conditions of the reaction. At least a portion of the organic precursor, carbonaceous material and/or by-products formed functions as a reductant during the synthesis reaction for the active material, before, during and/or after the organic precursor undergoes thermal decomposition. Such precursors include any liquid or solid organic material (e.g. sugars and other carbohydrates, including derivatives and polymers thereof).

Although the reactions may be carried out in the presence of oxygen, the reaction is preferably conducted under an essentially non-oxidizing atmosphere so as not to interfere with the reduction reactions taking place. An essentially non-oxidizing atmosphere can be achieved through the use of vacuum, or through the use of inert gases such as argon, nitrogen, and the like.

Preferably, the particulate starting materials are heated to a temperature below the melting point of the starting materials. The temperature should is about 400° C. or greater, and desirably about 450° C. or greater. CO or $CO_2$ evolve during the reaction. Higher temperatures favor CO formation. Some of the reactions are more desirably conducted at temperatures greater than about 600° C.; most desirably greater than about 650° C. Suitable ranges for many reactions are from about 700 to about 950° C.

At about 700° C. both the C→CO and the C→$CO_2$ reactions are occurring. At closer to about 600° C. the C→$CO_2$ reaction is the dominant reaction. At closer to about 800° C. the C→CO reaction is dominant. Since the reducing effect of the C→$CO_2$ reaction is greater, the result is that less carbon is needed per atomic unit of metal to be reduced.

The starting materials may be heated at ramp rates from a fraction of a degree up to about 10° C. per minute. Once the desired reaction temperature is attained, the reactants (starting materials) are held at the reaction temperature for a time sufficient for the reaction to occur. Typically the reaction is carried out for several hours at the final reaction temperature.

After reaction, the products are preferably cooled from the elevated temperature to ambient (room) temperature (i.e., about 10° C. to about 40° C.). It is also possible to quench the products to achieve a higher cooling rate, for example on the order of about 100° C./minute. The thermodynamic considerations such as ease of reduction of the selected starting materials, the reaction kinetics, and the melting point of the salts will cause adjustment in the general procedure, such as the amount of reducing agent, the temperature of the reaction, and the dwell time.

Electrochemical Cells:

To form an electrode, active material synthesized using an alkali metal hydrogen phosphate of the present invention is combined with other suitable materials (e.g. a polymeric binder). To form an electrochemical cell, a liquid or solid electrolyte is interposed between the electrode and a counter-electrode. Counter electrodes, electrolyte composition, and methods for making the same, among those useful herein, are described in U.S. Pat. No. 5,700,298, Shi et al., issued Dec. 23, 1997; U.S. Pat. No. 5,830,602, Barker et al., issued Nov. 3, 1998; U.S. Pat. No. 5,418,091, Gozdz et al., issued May 23, 1995; U.S. Pat. No. 5,508,130, Golovin, issued Apr. 16, 1996; U.S. Pat. No. 5,541,020, Golovin et al., issued Jul. 30, 1996; U.S. Pat. No. 5,620,810, Golovin et al., issued Apr. 15, 1997; U.S. Pat. No. 5,643,695, Barker et al., issued Jul. 1, 1997; U.S. Pat. No. 5,712,059, Barker et al., issued Jan. 27, 1997; U.S. Pat. No. 5,851,504, Barker et al., issued Dec. 22, 1998; U.S. Pat. No. 6,020,087, Gao, issued Feb. 1, 2001; and U.S. Pat. No. 6,103,419, Saidi et al., issued Aug. 15, 2000; all of which are incorporated by reference herein.

Electrochemical cells composed of electrodes, electrolytes and other materials, among those useful herein, are described in the following documents, all of which are incorporated by reference herein: U.S. Pat. No. 4,668,595, Yoshino et al., issued May 26, 1987; U.S. Pat. No. 4,792,504, Schwab et al., issued Dec. 20, 1988; U.S. Pat. No. 4,830,939, Lee et al., issued May 16, 1989; U.S. Pat. No.

4,935,317, Fauteaux et al., issued Jun. 19, 1980; U.S. Pat. No. 4,990,413, Lee et al., issued Feb. 5, 1991; U.S. Pat. No. 5,037,712, Shackle et al., issued Aug. 6, 1991; U.S. Pat. No. 5,262,253, Golovin, issued Nov. 16, 1993; U.S. Pat. No. 5,300,373, Shackle, issued Apr. 5, 1994; U.S. Pat. No. 5,399,447, Chaloner-Gill, et al., issued Mar. 21, 1995; U.S. Pat. No. 5,411,820, Chaloner-Gill, issued May 2, 1995; U.S. Pat. No. 5,435,054, Tonder et al., issued Jul. 25, 1995; U.S. Pat. No. 5,463,179, Chaloner-Gill et al., issued Oct. 31, 1995; U.S. Pat. No. 5,482,795, Chaloner-Gill., issued Jan. 9, 1996; U.S. Pat. No. 5,660,948, Barker, issued Sep. 16, 1995; and U.S. Pat. No. 6,306,215, Larkin, issued Oct. 23, 2001.

The following non-limiting examples illustrate the compositions and methods of the present invention.

EXAMPLE 1

Lithium hydrogen phosphate ($Li_xH_{(3-x)}PO_4$, where x=1) is made from $Li_2CO_3$ and orthophosphoric acid ($H_3PO_4$), according to reaction scheme (E).

$$Li_2CO_3 + 2H_3PO_4 \rightarrow 2LiH_2PO_4 + H_2O + CO_2 \quad (E)$$

The reactants are pre-mixed according to the following proportions:

| | |
|---|---|
| 10.4 mol $Li_2CO_3$ (73.88 g/mol) = | 768 g |
| 20.8 mol $H_3PO_4$, 85% aq. solution = | 2496 g |

Approximately 768 grams of $Li_2CO_3$, in substantially dry powder form, is placed in the bottom of a reactor vessel. Approximately 832 grams of an 85% phosphoric acid solution is admixed with the $Li_2CO_3$ in a first dose in the reactor vessel. Upon addition of the phosphoric acid to the lithium carbonate, a foaming mixture with a paste-like consistency is formed. The mixture is vigorously agitated using a Hobart N-50 mixer with a whisk mixer attachment, operated continuously to agitate and mix the reaction mixture to reduce foam formation to below the volume of the reactor vessel. The whisk attachment compresses the foaming mixture to release the formed gas. The remaining 1663 g of 85% phosphoric acid solution is admixed in a second dose with the reaction mixture. The LHP solution thus produced is hot and highly concentrated. The product is heated and vacuum dried at 90° C. to form a pure $LiH_2PO_4$ material in powder form.

EXAMPLE 2

An electrode active material of the formula $LiFePO_4$ is made according to the following reaction scheme (F), wherein $LiH_2PO_4$ is synthesized according to Example 1.

$$Fe_2O_3 + 2LiH_2PO_4 + xC \rightarrow 2(LiFePO_4 + yC) + aCO_2 + bCO + H_2O \quad (F)$$

wherein x=2y+a+b, and y is about, 7 wt % of the $LiFePO_4$ electrode active material product.
The reactants are pre-mixed according to the following proportions:

| | |
|---|---|
| 1 mol $Fe_2O_3$ (159.7 g/mol) = | 159.7 g |
| 2 mol $LiH_2PO_4$ (103.9 g/mol) = | 207.8 g |

The mixture is pelletized, and transferred to a temperature-controlled tube furnace equipped with an argon gas flow. The mixture is heated at a ramp rate of about 2° C./minute to an ultimate temperature of about 750° C. in the inert atmosphere and maintained at this temperature for about 4 hours. The product is then cooled to ambient temperature (about 22° C.). The amount y of residual carbon depends upon the amount x of carbon added, if any, to the reactants, and upon the synthesis conditions. Any desired amount y of residual carbon can be produced under a given set of synthesis conditions by adding sufficient added carbon x. The finished material can be made with residual carbon or with no residual carbon. Carbon can be added in at a later step by combining the carbon with the electrode active material final product (in other words, x=0, and carbon is added to the mixture following the reaction). As can be seen from the above noted reaction scheme (F), formation of unwanted by-products (e.g. $NH_3$) is obviated.

EXAMPLE 3

An electrode active material of the formula $LiFe_{0.95}Mg_{0.05}PO_4$ is made according to the following reaction scheme (G), wherein $LiH_2PO_4$ is synthesized according to Example 1.

$$0.95Fe_2O_3 + 0.1Mg(OH)_2 + 2LiH_2PO_4 + xC \rightarrow 2(LiFe_{0.95}Mg_{0.05}PO_4 + yC) + aCO_2 + bCO + 1.1H_2O \quad (G)$$

wherein x=y+a+b, and y is about 7 wt % of the $LiFe_{0.95}Mg_{0.05}PO_4$ electrode active material product.

The reactants are pre-mixed according to the following proportions:

| | |
|---|---|
| 0.95 mol $Fe_2O_3$ (159.7 g/mol) = | 151.7 g |
| 0.1 mol $Mg(OH)_2$ (58.32 g/mol) = | 5.830 g |
| 2 mol $LiH_2PO_4$ (103.9 g/mol) = | 207.9 g |

The mixture is then subjected to the reaction conditions specified in Example 2 to form the $LiFe_{0.95}Mg_{0.05}PO_4$ active material. The amount of carbon added to the mixture, if any, is as discussed above with respect to Example 2. As can be seen from the above noted reaction scheme (G), formation of unwanted by-products (e.g. $NH_3$) is obviated.

EXAMPLE 4

An electrode active material of the formula $Li_{1.025}Co_{0.8}Fe_{0.1}Mg_{0.025}Al_{0.025}Ti_{0.025}PO_4$ is made according to the following reaction scheme (H), wherein $LiH_2PO_4$ is synthesized according to Example 1.

$$0.05Fe_2O_3 + 0.025Mg(OH)_2 + LiH_2PO_4 + 0.025 \text{ moles } Li_2CO_3 + 0.025 \text{ mol } Al(OH)_3 + 0.27 \text{ mol } Co_3O_4 + xC \rightarrow (Li_{1.025}Co_{0.8}Fe_{0.1}Mg_{0.025}Al_{0.025}Ti_{0.025}PO_4 + yC) + aCO_2 + bCO + H_2O$$

wherein x=y+(a−0.025)+b
and y is about 7 wt % of the $Li_{1.025}Co_{0.8}Fe_{0.1}Mg_{0.025}Al_{0.025}Ti_{0.025}PO_4$ electrode active material product.

The reactants are pre-mixed according to the following proportions:

| | |
|---|---|
| 0.025 moles $Li_2CO_3$ (73.88 g/mol) = | 1.847 |
| 0.27 mol $Co_3O_4$ (240.8 g/mol) = | 6.820 g |
| 0.05 mol $Fe_2O_3$ (159.7 g/mol) = | 0.4000 g |
| 0.025 mol $Al(OH)_3$ (78.00 g/mol) = | 0.1950 g |
| 0.025 mol $Mg(OH)_2$ (58.32 g/mol) = | 0.2900 g |
| 1 mol $LiH_2PO_4$ (103.9 g/mol) = | 13.20 g |

The mixture is then subjected to the reaction conditions specified in Example 2 to form the $Li_{1.025}Co_{0.8}Fe_{0.1}Mg_{0.025}Al_{0.025}Ti_{0.025}PO_4$ active material. The amount of carbon added to the mixture, if any, is as discussed above with respect to Example 2. As can be seen from the above noted reaction scheme, formation of unwanted by-products (e.g. $NH_3$) is obviated.

EXAMPLE 5

Lithium hydrogen phosphate ($Li_xH_{(3-x)}PO_4$, where x=1.5) is made from $Li_2CO_3$ and orthophosphoric acid ($H_3PO_4$), according to reaction scheme (I).

$$1.5Li_2CO_3 + H_3PO_4 \rightarrow 2Li_{1.5}H_{1.5}PO_4 + H_2O + CO_2 \quad (I)$$

The reactants are pre-mixed according to the following proportions:

| | |
|---|---|
| 31.2 mol $Li_2CO_3$ (73.88 g/mol) = | 2305 g |
| 20.8 mol $H_3PO_4$, 85% aq. solution = | 2496 g |

The mixture is then subjected to the reaction conditions specified in Example 1 to form the $Li_{1.5}H_{1.5}PO_4$ electrode active material precursor.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A method for making an electrode active material compound of the general formula $$A_aM_b(PO_4)_cZ_d,$$

wherein A comprises at least one alkali metal, M comprise at least one element selected from the group consisting of Ti, V, Cr, Mn, Fe, Co, Ni, Cu, Zr, Nb, Mo, Ru, Rh, Pd, Ag, Cd, Hf, Ta, W, Re, Os, Ir, Pt, Au, Hg, and mixtures thereof, Z is selected from the group consisting of a halogen, a hydroxyl group, and a mixture thereof, $0<a\leq 6$, $1\leq b\leq 3$, $1\leq c\leq 3$, and $0\leq d\leq 2$, wherein M, Z, a, b, c and d are selected so as to maintain electroneutrality of said electrode active material compound, said method comprising the steps of:

(a) forming an alkali metal hydrogen phosphate precursor compound having the formula $A_xH_{3-x}PO_4$ wherein $0\leq x\leq 3$, and wherein A is said at least one alkali metal, by:

(i) admixing an alkali metal-containing compound, a phosphate-supplying compound, and water to form an aqueous mixture, wherein said water is present in said aqueous mixture at a level from about 5% to about 25% by weight; and (ii) agitating said aqueous mixture to form said alkali metal hydrogen phosphate precursor compound;

(b) intimately admixing said alkali metal hydrogen phosphate precursor compound and at least one M-containing compound to form a precursor composition mixture; and (c) heating said precursor composition mixture at a temperature and for a time sufficient to form said electrode active material compound.

2. The method according to claim 1, wherein said alkali metal-containing compound is lithium hydroxide, said phosphate-supplying acidic compound is phosphoric acid, and $0<x<3$.

3. The method according to claim 1, wherein said alkali metal-containing basic compound is lithium carbonate, said phosphate-supplying acidic compound is phosphoric acid, and $0<x<3$.

4. The method according to claim 1, wherein said precursor reaction mixture further comprises a reducant.

5. The method according to claim 4, wherein said alkali metal-containing compound is lithium hydroxide, said phosphate-supplying acidic compound is phosphoric acid, and $0<x<3$.

6. The method according to claim 4, wherein said alkali metal-containing basic compound is lithium carbonate, said phosphate-supplying acidic compound is phosphoric acid, and $0<x<3$.

7. The method according to claim 6, wherein said admixing step and said agitating step are performed substantially concurrently.

8. The method according to claim 4, wherein said mixing device is a continuous mixer.

9. The method according to claim 4, wherein said step of forming said alkali metal hydrogen phosphate precursor compound further comprises a drying step to form a solid lithium hydrogen phosphate compound.

10. The method according to claim 9, further comprising a step of milling said solid lithium hydrogen phosphate compound after said drying step.

11. The method according to claim 1, wherein M is at least one transition metal selected from the group consisting of Ti, V, Cr, Mn, Fe, Ca, Ni, Cu, and mixtures thereof.

12. The method according to claim 1, wherein M comprises $M'_{1-e}M''_e$, wherein M' is at least one element selected from the group consisting of Ti, V, Cr, Mn, Fe, Co, Ni, Cu, Zr, Nb, Mo, Ru, Rh, Pd, Ag, Cd, H, Ta, W, Re, Os, Ir, Pt, Au, Hg, and mixtures thereof; and where M" is at least one element selected from the group consisting of Groups 2, 3, and 12 through 16 of the Periodic Table; and $0<e<1$.

13. The method according to claim 12, wherein M' is at least one transition metal selected from the group consisting of Ti, V, Cr, Mn, Fe, Co, Ni, Cu, and mixtures thereof; and M" is at least one non-transition metal selected from the group consisting of Be, Mg, Ca, Sr, Ba, Zn, Cd, and mixtures thereof.

14. The method according to claim 12, wherein M' is at least one transition metal selected from the group consisting of Ti, V, Cr, Mn, Fe, Co, Ni, Cu, and mixtures thereof; and M" is at least one non-transition metal selected from the group consisting Sc, Y, La, B, Al, Ga, In, and mixtures thereof.

15. The method according to claim 1, wherein M is $M^1_eM^2_fM^3_g$, wherein (a) $M^1$ is at least one element selected from the group consisting of Ti, V, Cr, Mn, Fe, Co, Ni, Cu, Zr, Nb, Mo, Ru, Rh, Pd, Ag, Cd, Hf, Ta, W, Re, Os, Ir, Pt, Au, Hg, and mixtures thereof, and $e>0$;

(b) $M^2$ is at least one +2 oxidation state non-transition metal, and $f>0$; and (c) $M^3$ is at least one +3 oxidation state non-transition metal, and $g>0$;

wherein $M^1$, $M^2$, $M^3$, a, c, d, e, f and g are selected so as to maintain electroneutrality of said compound.

16. The method according to claim 15, wherein $M^1$ is selected from the group consisting of Ti, V, Cr, Mn, Fe, Co, Ni, Cu, and mixtures thereof.

17. The method according to claim 15, wherein $M^2$ is selected from the group consisting of Mg, Ca, Zn, Sr, Pb, Cd, Sn, Ba, Be, and mixtures thereof.

18. The method according to claim 15, wherein $M^3$ is selected from the group consisting of Sc, Y, La, B, Al, Ga, In, and mixtures thereof.

19. The method according to claim 1, wherein said M comprises Co and Fe and at least one metal capable of undergoing oxidation to a higher valence state.

20. The method according to claim 1, wherein c is equal to 1.

21. The method according to claim 1, wherein c is equal to 3.

22. The method according to claim 1, further comprising a step of admixing a halogen-containing salt with said electrode active material compound to form a second precursor composition mixture; and heating said second precursor composition mixture to a temperature and for time sufficient to form a halogenated electrode active material compound.

23. The method according to claim 1, further comprising a step of admixing carbon with said electrode active material compound.

24. The method according to claim 1, wherein $0 < x < 3$.

25. The method according to claim 1, wherein said precursor composition mixture further comprises carbon.

* * * * *

UNITED STATES PATENT AND TRADEMARK OFFICE
CERTIFICATE OF CORRECTION

PATENT NO. : 6,794,084 B2
DATED : September 21, 2004
INVENTOR(S) : George W. Adamson et al.

It is certified that error appears in the above-identified patent and that said Letters Patent is hereby corrected as shown below:

Column 14,
Line 28, delete "Ca," and insert -- Co -- therefor.
Line 32, delete "H," and insert -- Hf -- therefor.

Signed and Sealed this

Eighth Day of February, 2005

JON W. DUDAS
*Director of the United States Patent and Trademark Office*